(12) United States Patent
Mozzi et al.

(10) Patent No.: US 8,920,160 B2
(45) Date of Patent: Dec. 30, 2014

(54) LOW NOX EMISSION INDUSTRIAL BURNER AND COMBUSTION PROCESS THEREOF

(75) Inventors: Enrico Mozzi, Genoa (IT); Michele Valenza, Spotorno (IT)

(73) Assignee: Danieli & C. Officine Meccaniche S.p.A., Buttrio (IT)

( * ) Notice: Subject to any disclaimer, the term of this patent is extended or adjusted under 35 U.S.C. 154(b) by 870 days.

(21) Appl. No.: 12/734,128

(22) PCT Filed: Oct. 10, 2008

(86) PCT No.: PCT/EP2008/063644
§ 371 (c)(1),
(2), (4) Date: Apr. 12, 2010

(87) PCT Pub. No.: WO2009/047338
PCT Pub. Date: Apr. 16, 2009

(65) Prior Publication Data
US 2010/0233642 A1  Sep. 16, 2010

(30) Foreign Application Priority Data
Oct. 12, 2007  (IT) ............... MI2007A1985

(51) Int. Cl.
| | |
|---|---|
| *F23D 14/20* | (2006.01) |
| *F23C 6/04* | (2006.01) |
| *F23D 14/22* | (2006.01) |
| *F23N 1/02* | (2006.01) |

(52) U.S. Cl.
CPC ............... *F23C 6/047* (2013.01); *F23D 14/22* (2013.01); *F23N 1/022* (2013.01); *F23C 2201/20* (2013.01); *F23C 2202/40* (2013.01); *F23C 2900/07021* (2013.01); *F23C 2900/99001* (2013.01); *F23D 2900/14124* (2013.01); *F23L 2900/07007* (2013.01); *Y02E 20/342* (2013.01); *Y02E 20/344* (2013.01)
USPC ............... 431/278; 431/283; 431/284; 431/8; 431/9

(58) Field of Classification Search
USPC ........... 431/278, 283, 284, 285, 8, 9, 10, 159, 431/164, 165, 174, 175, 181, 186, 187, 188, 431/350, 351, 328, 329
See application file for complete search history.

(56) References Cited

U.S. PATENT DOCUMENTS

| | | | |
|---|---|---|---|
| 4,257,763 | A | 3/1981 | Reed |
| 4,505,666 | A | 3/1985 | Martin et al. |
| 5,269,678 | A | 12/1993 | Schwartz et al. |
| 5,431,559 | A | 7/1995 | Taylor |
| 6,234,092 | B1 | 5/2001 | Domschke et al. |

FOREIGN PATENT DOCUMENTS

| | | |
|---|---|---|
| EP | 0685683 | 12/1995 |
| WO | WO2005/052446 | 6/2005 |

*Primary Examiner* — Alfred Basichas
(74) *Attorney, Agent, or Firm* — Stetina Brunda Garred & Brucker (57) ABSTRACT

Low $NO_x$ emission industrial burner, adapted to operate both in a flame or stage mode and in a flameless mode, so that also the heating step of the chamber of a furnace may be made by means of the same burner, without providing a pilot burner, thus ensuring very low $NO_x$ emissions for the whole operation range of the burner and for the whole range of temperatures in the chamber. The combustion process, made by means of said burner, provides for the possibility to combine the stage mode operation with the flameless mode operation.

18 Claims, 6 Drawing Sheets

LOW NOX EMISSION INDUSTRIAL BURNER AND COMBUSTION PROCESS THEREOF

FIELD OF THE INVENTION

The present invention relates to an industrial gas-fuel burner, specifically to a very low $NO_x$ emission burner adapted to perform both a stage combustion ("flame" mode) and a combustion without a flame front ("flameless" mode), and to a combustion process thereof.

STATE OF THE ART

The limitations concerning $NO_x$ concentrations in exhaust fumes, which are imposed by national and international regulations, considerably affect the design of new burners to achieve an optimal efficiency and at the same time to produce polluting emissions within the set limitations. The inventors and the companies producing burners in recent years have searched for design solutions improving the efficiencies of furnaces and at the same time decreasing the polluting emissions.

To increase the efficiency of the furnace, the comburent air is usually pre-heated thus recovering a part of the heat from the fumes, exchanging it with said comburent air, with the subsequent increase of the flame temperature; however, it is known that polluting emissions also vary as a function of the generated flame temperature: indeed, they increase as the flame temperature increases.

Specifically, the generated $NO_x$ emissions are given by the sum of two specific kinds of $NO_x$ which differ in their formation mode: "thermal" $NO_x$ and "prompt" $NO_x$. As known, "thermal" $NO_x$, i.e. NO oxide, is generated by an oxidation mechanism of the atmospherical nitrogen occurring at high temperatures (1200° C.). It is therefore typical of the flame front and of the area of the combustion products, where nitrogen remains at a high temperature for a longer or shorter time. The "prompt" $NO_x$ is instead related to the reaction among intermediate radicals at the flame front. The formation mechanism is named after the short characteristic reaction time. The parameters affecting the formation of $NO_x$ are mainly: high temperature, high temperature residence time, air excess, poor fume recirculation and nitrogen content in the fuel.

Various combustion techniques are known to overcome the problem regarding the $NO_x$ concentration, for instance: diluted combustion, stage combustion and volume combustion.

Usually, stage combustion may be performed through air staging or gas staging or through the combination of both solutions. These kinds of solutions imply specific design complications, such as for instance the presence of a dual inlet for air and gas.

In the case of air staging, the primary combustion is performed under air deficiency with a significant gas excess thus obtaining an intentionally incomplete combustion; the air portion amount, which is required to complete the combustion partially performed during the first stage, is injected during the secondary combustion. The overall result is the exclusion of the simultaneous occurrence of a high flame temperature and a high oxygen concentration which are, as already noted, the causes of $NO_x$ formation.

Another known technique which allows a further decrease of the polluting emissions is volume combustion, which is commonly designated as "flameless combustion". The advantages resulting from this technique may be noted as a reduction in the production of $NO_x$ and as the uniformity in temperature within the combustion chamber.

The volume combustion technique is performed through a significant dilution of the pure reagents, i.e. comburent air and fuel gas, which are mixed with the combustion products, substantially inert gases, for a further combustion to take place before this occurs. The combustion products are recirculated by the high injection rate of air and gas which draws them by an ejection effect. When the reagents, which are strongly diluted, come into contact at a high temperature, the result is a combustion without a visible flame front, from here the definition "flameless", which expands in a high volume of the combustion chamber thus making the temperature of the furnace uniform and decreasing the production of $NO_x$.

However, the flameless combustion displays a great use limitation: the combustion process may not be stably maintained ignited at temperatures lower than those required for fuel autoignition.

Therefore, because of this problem, most flameless burners are commonly provided with burners designated as pilot burners which serve to take the operating temperature of the furnace to the fuel autoignition temperature.

The result is that during the heating step of the furnace, in which the flameless combustion would be unstable, at least one pilot burner is used and the $NO_x$ emissions are very high as the latter does not employ any of the above mentioned $NO_x$ reduction techniques.

The result is that for temperatures of about 850° C. (natural gas autoignition temperature) the $NO_x$ emissions are very high and only decrease when the temperatures of the furnace are such as to allow the use of flameless burners.

Therefore, the emissions during the heating step hardly fall within the imposed limitations and in any case, during the operation of the furnace, situations may occur in which the low area temperature does not allow the use of a flameless mode.

The need is therefore felt for producing a burner and a related combustion process allowing to achieve very low $NO_x$ emissions both during the igniting step, i.e. in cold conditions, and in a steady state condition thereof.

SUMMARY OF THE INVENTION

It is the object of the present invention to provide a low $NO_x$ emission industrial burner, adapted to operate both in a flame or stage mode and in a flameless mode, so that the heating step of the chamber of a furnace may also be performed by means of the same burner, without providing a pilot burner, thus ensuring very low $NO_x$ emissions for the whole operation range of the burner and for the whole range of temperatures of the chamber.

A further object of the invention is to provide a combustion process, performed by said burner, which provides for the possibility to combine the stage operating mode with the flameless mode achieving a considerable reduction of polluting emissions.

Therefore, the present invention aims to achieve the above disclosed objects by providing, according to a first aspect of the invention, a low $NO_x$ emission industrial burner, which, according to claim 1, includes a hollow metal body defining a longitudinal axis (X); a refractory diffuser, arranged at an open end of the hollow body so as to define a volume within said body; a first combustion area, obtained in a cavity of said refractory diffuser; a second combustion area downstream of the first combustion area and in communication therewith; a first injection lance of the fuel gas, centrally arranged within said hollow body, in communication at one end with said first combustion area; at least one second injection lance of the fuel gas, laterally arranged within said hollow body, directly in communication at one end with said second combustion area; switching means adapted to switch the injection of the fuel gas from the first injection lance to said at least one second injection lance or vice versa; a conduit for feeding comburent air into said volume; first longitudinal holes provided in the refractory diffuser and arranged along a first cylindrical side surface, the outlet section of which is directly in communication with the first combustion area for the injection of a first portion of comburent air; second longitudinal holes provided in the refractory diffuser and arranged along a second cylindrical side surface, which is coaxial and external to the first surface, the outlet section of which is directly in communication with the second combustion area for the injection of a second portion of comburent air; wherein said at least one second injection lance is at least partially housed within a respective second longitudinal hole, said burner being adapted to perform a multistage flame combustion during the heating step of a combustion chamber until the autoignition temperature of the fuel gas is reached and, indifferently, a multistage flame combustion or a flameless combustion at temperatures higher than said autoignition temperature, thus ensuring low $NO_x$ emissions at any operating conditions.

According to another aspect of the invention the above said objects are achieved by means of a combustion process featuring very low $NO_x$ emissions, which may be performed by means of the above said burner and a furnace with which the burner cooperatively operates, the process according to claim 9 including the following steps:

a) heating a combustion chamber of the furnace until the autoignition temperature of a used fuel gas is achieved, said heating being performed by means of the simultaneous operations of injecting a fuel gas through a first injection lance, centrally arranged within the burner, in a first combustion area of the combustion chamber;

injecting a first portion of comburent air into said first combustion area through first longitudinal holes of the refractory diffuser arranged along a first cylindrical side surface so that a primary combustion occurs with a gas excess;

injecting a second portion of comburent air into a second combustion area, arranged downstream of the first combustion area, through second longitudinal holes of the refractory diffuser arranged along a second cylindrical side surface which is coaxial and external with respect to the first surface, so that a secondary combustion occurs with an air excess which completes the combustion of the fuel gas injected;

b) when the temperature of the combustion chamber is higher than the autoignition temperature of the fuel gas, the combustion process continues including the following simultaneous operations of:

injecting fuel gas into the second combustion area through at least one second injection lance, laterally arranged within the burner and at least partially housed within a respective second hole;

injecting said first portion of comburent air into said first combustion area through the first longitudinal holes and injecting said second portion of comburent air into the second combustion area through the second longitudinal holes, so that a flameless combustion occurs because of a dilution of fuel gas and comburent air by the combustion products present in the combustion chamber;

wherein the variation of the injection of the fuel gas during the transition from step a) to step b) occurs by means of appropriate switching means.

The burner, according to the present invention, is particularly advantageous in some processes, where a low $NO_x$ emission flame mode burner is required, whereas a burner adapted to operate in a flameless mode is required in other processes. Specifically, said burner is adapted to operate in a flame or stage mode during the heating step of the furnace, i.e. when the operating temperature is below the autoignition temperature which is 850° C. for natural gas, and in both modes, stage or flameless, once the autoignition temperature of the fuel gas has been reached.

Advantageously, the burner of the invention achieves the best reduction of $NO_x$ when it operates in a flame mode below the autoignition temperature, with a very low level of nitrogen oxide emissions in virtue of the multistage combustion system, and in a flameless mode above said temperature, thus, further reducing the polluting emissions.

Therefore, the burner according to the present invention requires no pilot burner associated thereto, which takes in advance the temperature of the furnace above the autoignition temperature.

The technique performed through air staging obtained by a single air inlet and a single gas inlet is used in the burner according to the invention, thus obtaining a first combustion area or reducing area (rich in fuel gas), and a second combustion or oxidizing area (rich in air) including one or more intermediate areas and a final combustion area in which the combustion is completed. Said second combustion area includes at least one first cylindrically-profiled segment and a second segment having a divergent inner profile with respect to the longitudinal axis of the burner.

The multistage combustion according to the present invention aims to reduce the formation of nitrogen oxides through a primary combustion with a gas excess, a progressive reduction of the gas excess in the intermediate areas of the burner and a final (secondary) combustion with an air excess, so as to avoid the occurrence at the same time of a high temperature and a high concentration of $O_2$, which is the main cause of the formation of thermal nitrogen oxides ($NO_x$). The secondary combustion has an overstoichiometric ratio such as to complete the combustion and maintain the correct content of oxygen within the furnace. This kind of multistage combustion is performed by means of a central lance for the injection of fuel gas and a comburent air diffuser made of refractory material, provided with holes or nozzles, which serves to direct the comburent to different areas of the burner, which are increasingly distant from the outflow point of the gas from said lance, so as to identify in a sequence: a rear area, i.e. very near to the gas outflow point, within a cylindrical cavity that identifies the first stage of the combustion, one or more intermediate areas, and a forward area, downstream of said cylindrical cavity, which defines the last stage of the combustion and completes the mixing thereof.

The flameless combustion serves to further reduce the emissions of nitrogen oxides through a diluted combustion, by means of a considerable recirculation of the exhaust gases and a low percentage of oxygen present in the combustion phase. Another result achieved by this combustion system is due to a greater uniformity of the temperature within the furnace which may be translated in a greater temperature uniformity of the product.

The flameless combustion is performed by the burner according to the present invention through the feeding of the fuel gas into the furnace by one or more side lances, arranged at a determined distance from the longitudinal axis of the central lance. The feeding of the air remains advantageously unvaried with respect to the stage operating mode. The transition from the flame mode to the flameless mode is performed by automatic valves which switch the inlet of the fuel gas from a conduit to another one while maintaining the inlet of the comburent air unaltered.

Furthermore, the burner according to the present invention is advantageously connected to the reagent (air and gas) feeding system through a single feeding line for the comburent air and a single feeding line for the fuel gas. For the fuel gas said feeding line or conduit is subdivided near the burner into two inlet pipes which are respectively used in a flame mode and in a flameless mode.

Therefore, the result is that for any use condition of the burner, the polluting emissions will be low if the multistage combustion is used and will be further reduced if there is a switch to a flameless combustion above the gas autoignition temperature. The possibility to define two different types of flame by switching the feeding mode only of the fuel is especially advantageous in virtue of the multistage air injection system (in both operating modes).

The dependent claims describe preferred embodiments of the invention.

BRIEF DESCRIPTION OF THE FIGURES

Further features and advantages of the invention will become more apparent in light of the detailed description of preferred though not exclusive embodiments of a low $NO_x$ emission industrial burner, shown by way of non-limitative example with the aid of the accompanying drawings, in which.

DETAILED DESCRIPTION OF PREFERRED EMBODIMENTS OF THE INVENTION

Figure 1:
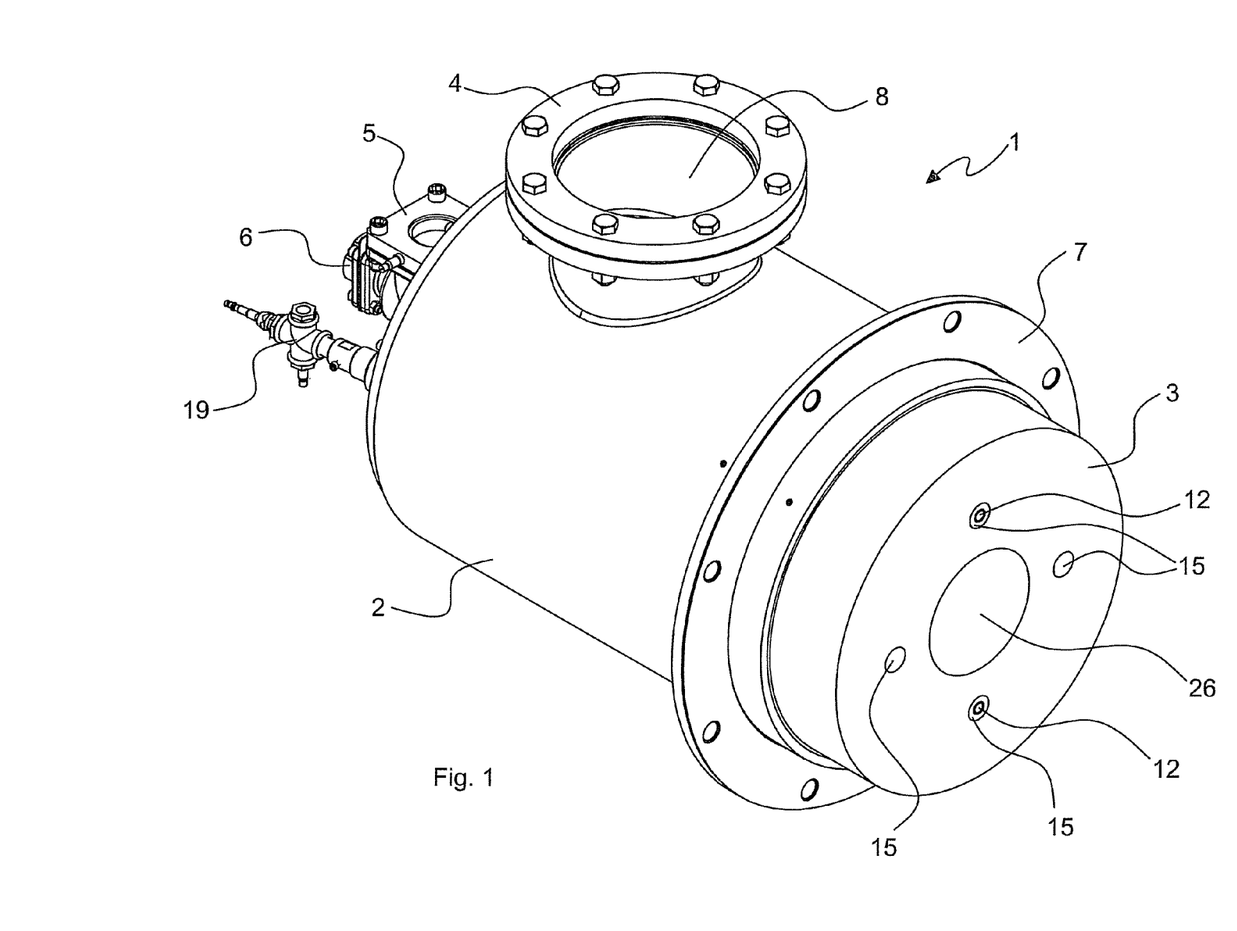
FIG. 1 shows a first perspective view of the burner according to the present invention.
Figure 1A:
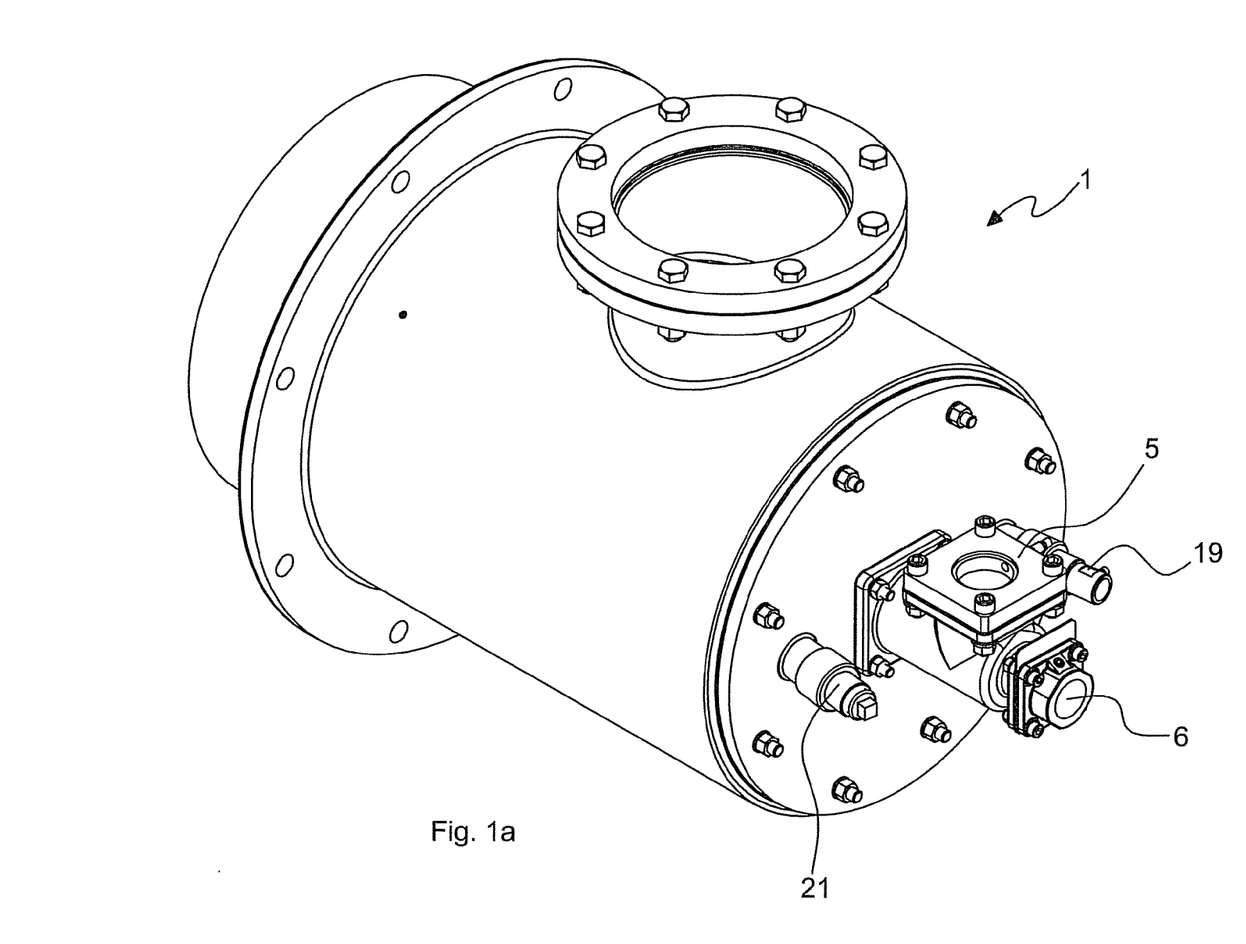
FIG. 1a shows a second perspective view of the burner in FIG. 1.
Figure 2:
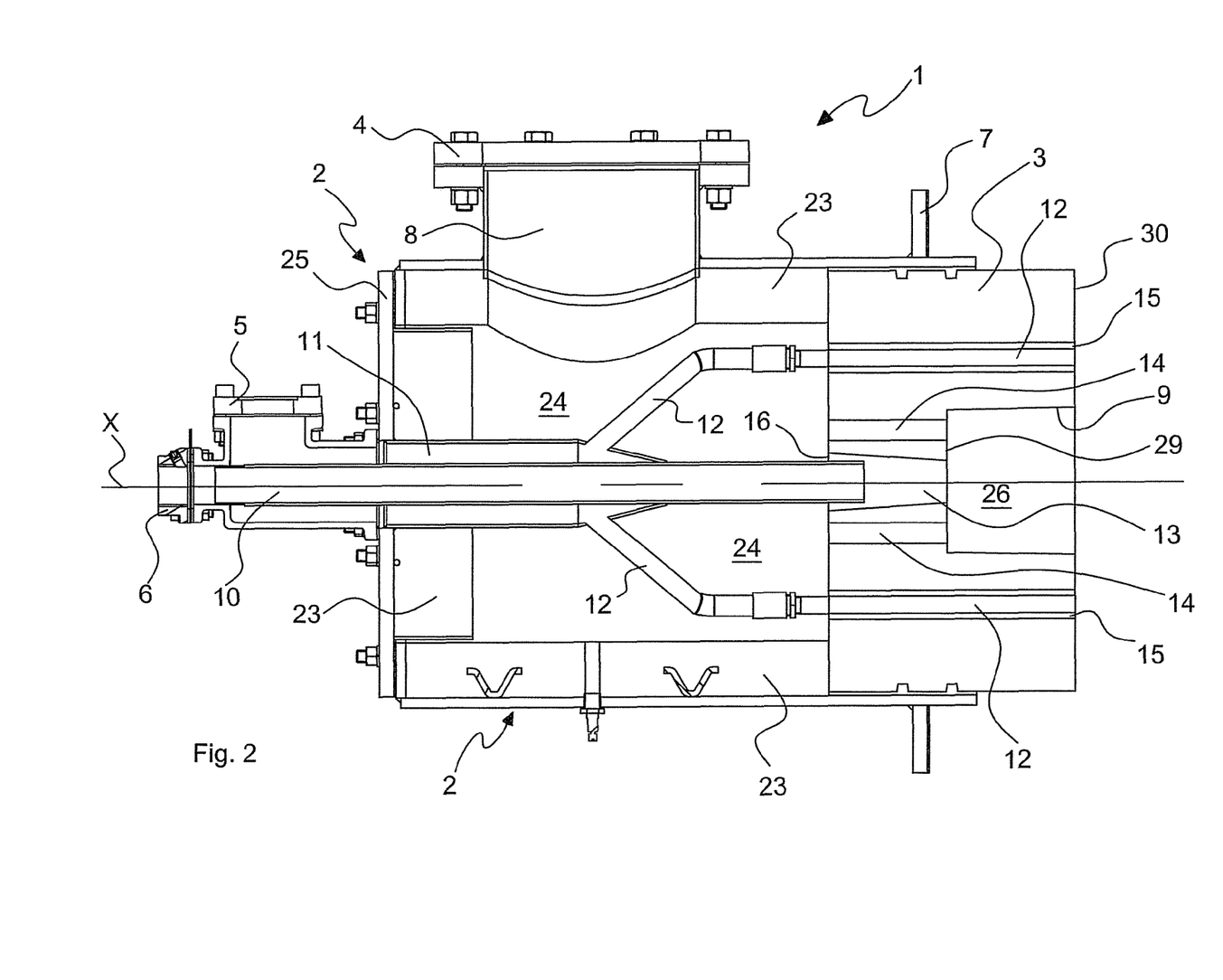
FIG. 2 shows a diagrammatic cross section of a first embodiment of the burner in FIG. 1.
Figure 2A:
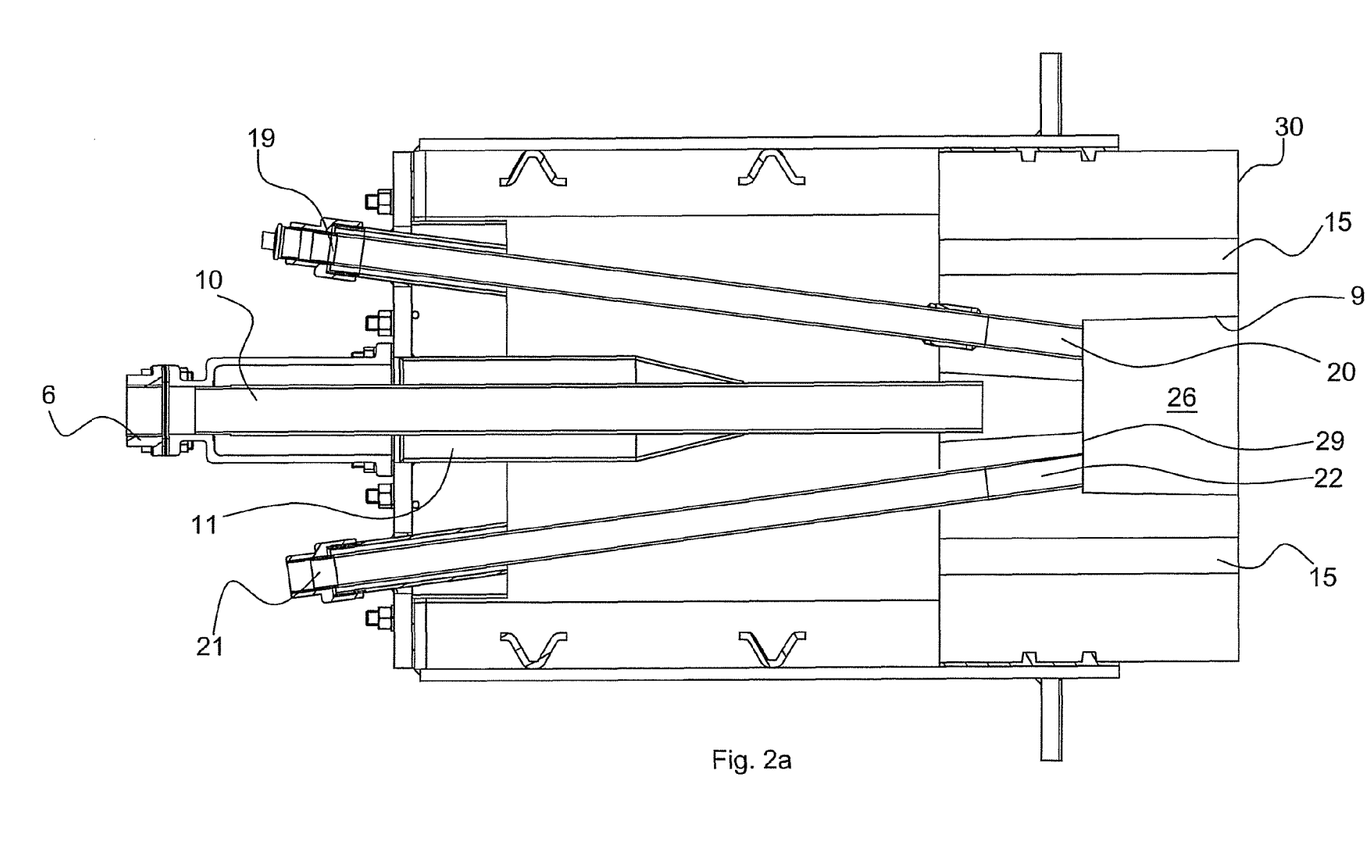
FIG. 2a shows a diagrammatic bottom cross-sectional view of said first embodiment of the burner.
Figure 3:
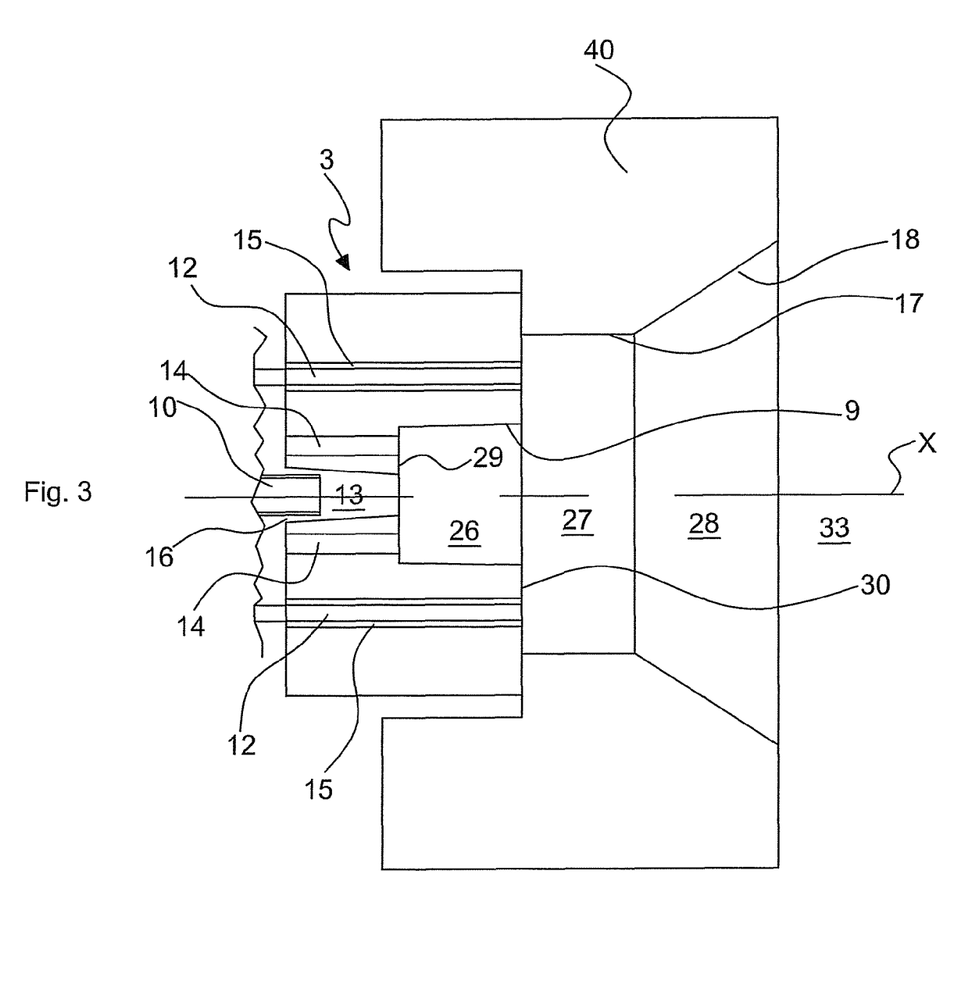
FIG. 3 shows a partial section view of the burner of the invention, provided with the diffuser.

A first embodiment of a burner 1 according to the present invention is disclosed with reference to the FIGS. 1 to 3, the burner being adapted to perform a combustion by means of the combination of the operation in a dual-stage mode (flame mode) and in a flameless mode. The burner 1 includes:
- a main metal body 2 having a cylindrical shape, defining a longitudinal axis X,
- a feeding conduit for the comburent air 8,
- a refractory diffuser 3 for the passage of fuel gas and comburent air in the combustion chamber in the furnace,
- a fixing flange 7 for the securing to the furnace wall;
- a gas feeding lance 10 for the dual-stage combustion,
- a gas feeding lance 11, for the flameless combustion, which at one end thereof is subdivided into two or more side lances 12,
- a housing obtained in the metal body 2 for an optional pilot ignition device 19,
- a housing obtained in the metal body 2 for an optional flame detection device 21.

The air feeding conduit 8 is in communication at one end with the pipes of the feeding system through the flange 4 and at the other end with the volume 24 within the cylindrical body 2. Said volume 24 is defined by the insulating coating 23 which is internal to the body 2, by the rear wall 25, for instance having a circular shape, and by the refractory diffuser 3. The rear wall 25 is perforated for the passage of the gas lance 11, the passage of the gas lance 10, which is concentrical and coaxially arranged within a segment of the lance 11, and for the housings of the pilot ignition device 19 and of the flame detection device 21.

The refractory diffuser 3, having for instance a cylindrical shape, is provided with holes 14 for the passage of a first portion of comburent air, designated as primary air, and holes 15 for the passage of a second portion of comburent air, designated as secondary air, into the chamber of the furnace. The diffuser is also provided with a central hole 16 for the passage of air, in which an end of the lance 10 is inserted for feeding the fuel gas in a dual stage mode. Alternatively, the central hole 16 has a diameter suitable only for housing one end of the gas lance 10 without allowing the passage of air from the volume 24 to the chamber of the furnace.

Advantageously the two or more side gas lances 12 for the flameless mode feeding are positioned partially within the volume 24 and partially within some of the holes 15 for the secondary air passage. This arrangement therefore allows a cooling of the lances 12 by means of the air flow outside them. Usually in the known burners, possible side lances are arranged outside the body of the burner, thus making the cooling system more complicated, and are also provided with a separate gas inlet conduit.

In a preferred variant of the burner there are provided two lances 12 partially positioned coaxially within two of the four holes 15 for the passage of secondary air into the combustion chamber of the furnace.

The gas lance 10 is in communication at one end with the piping of the feeding system through an axial flange 6 and at the other end with the hole 16 placed centrally in the refractory diffuser 3. In the embodiment of FIG. 2 the section of the hole 16 is the inlet section of a communication conduit 13 between the volume 24 and a cavity or area 26, obtained in the diffuser 3, in which the holes 14 for the passage of the primary air are also opened.

The gas lance 11 is in communication at one end with the piping of the feeding system through the flange 5, defining an axis orthogonal to the axis of the flange 6, and at the other end with the at least two gas lances 12 for the feeding in a flameless mode.

There is a single feeding conduit for the fuel gas near the burner, the feeding conduit being subdivided into two inlet pipes directly connected to the flanges 5 and 6. These two inlet pipes are provided with switching valves which control the feeding to the lance 10 and to the lance 11.

The inlet of the air into the combustion chamber is performed by means of the holes 14, 15, 16 obtained in the refractory diffuser. Specifically, the holes 14, preferably in number of four, allow the introduction of the primary air in the first area 26 where it is mixed with the gas, and the holes 15, preferably in number of four, allow the introduction of the secondary air in the second mixing area, including the areas 27 and 28 (FIG. 3), arranged downstream of the first area 26.

The axes of the holes 14 are parallel and arranged on a cylindrical side surface, coaxial and external with respect to said central hole 16; said axes are equally spaced from one another and from the longitudinal axis of the gas lance 10.

Similarly, the axes of the holes 15 are parallel and arranged on a further cylindrical surface; these are also equally spaced from one another and from the axis X of the gas lance 10. The distance thereof from the axis X of the gas lance 10 is greater than that of the axes of the holes 14 of the primary air.

According to the present invention, the burner may have another passage for the air through the hole 16, concentrical to the gas lance 10, which is adapted to allow the ignition of the burner and a first mixing between the reagents in the conduit 13. The volume of the first mixing area 26 is defined by the substantially cylindrical segment 9, by the outer wall 29 of the refractory diffuser 3 and by the second mixing area including the areas 27 and 28. Specifically, the area 27 is defined in turn by the outer wall 30 of the diffuser 3, which is concentrical to the wall 29, by the cylindrical segment 17 and by the area 28. Said area 28 is defined by the area 27, by the divergent segment 18, having for instance a frusto-conical surface), and by the chamber 33 of the furnace.

The cylindrical segment 17 and the divergent frusto-conical segment 18 (FIG. 3) are obtained in the part of the wall 40 of the furnace in which the burner is inserted.

The holes 20 and 22 (FIG. 2a), for the passage respectively of the optional pilot ignition device 19 and of the optional flame detection device 21 with a UV cell, are provided in the outer wall 29, perpendicular to the longitudinal axis X, of the refractory diffuser, as well as the holes 14 of the primary air and the outlet section of the conduit 13.

The holes 15 for the secondary air and the outlet section for the gas lances 12 are provided in the outer wall 30 of the refractory diffuser.

Figure 4:
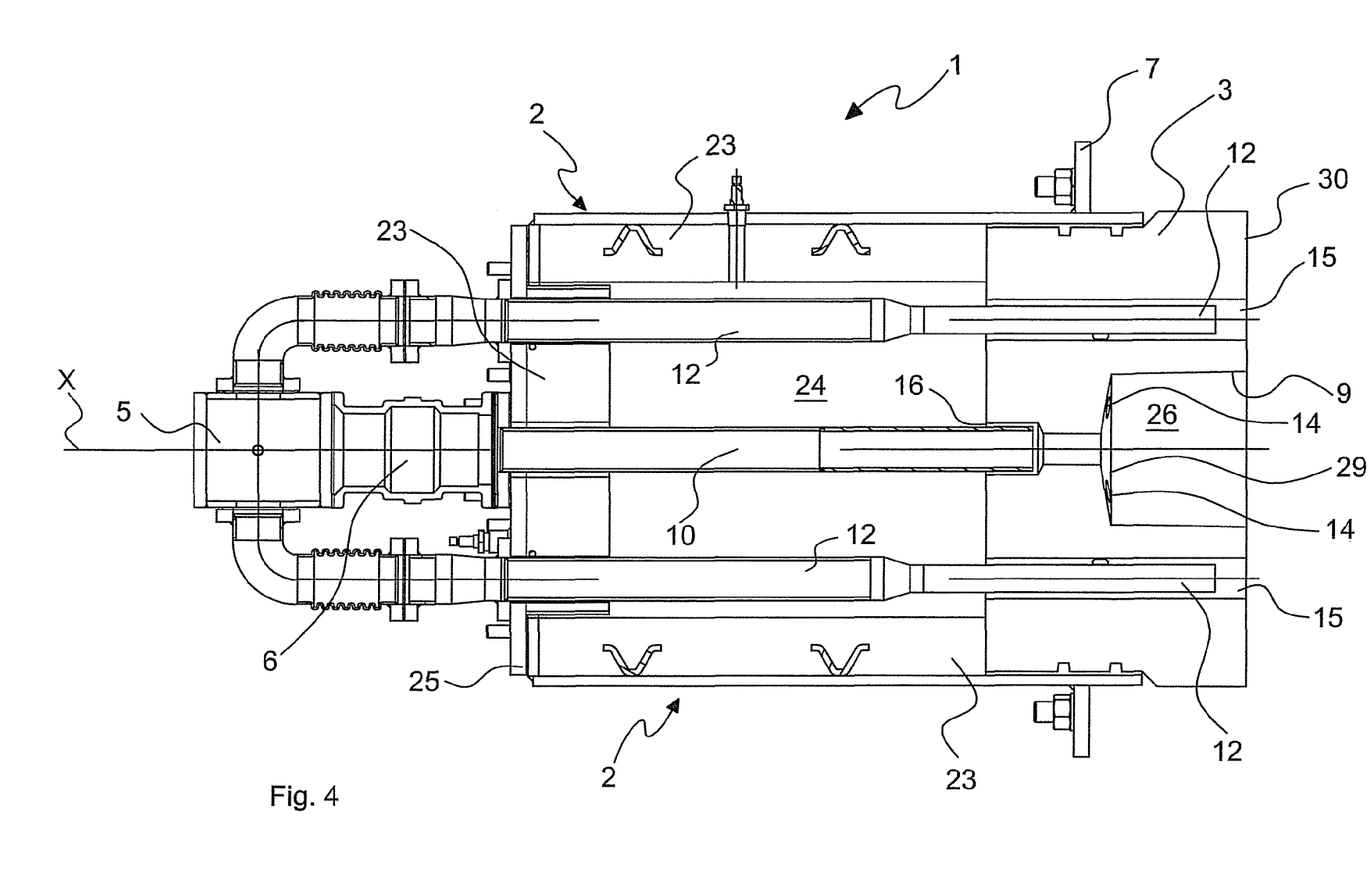
FIG. 4 shows a diagrammatic cross section of a second embodiment of the burner in FIG. 1.

A second embodiment of a burner 1 according to the present invention is disclosed with reference to the FIG. 4. This burner comprises the same elements provided in the first embodiment, indicated by the same numeral references, except for the gas feeding lance 11.

This second embodiment of burner is provided with at least one side gas feeding lance 12. The rear wall 25 of the volume 24 is perforated for the passage of said at least one side gas lance 12, for the passage of the central gas lance 10 and for the housings of an optional pilot ignition device and of an optional flame detection device. In the preferred variant of FIG. 4 the burner is provided with two side gas feeding lances 12 for the flameless mode feeding, said side lances 12 crossing the entire longitudinal extension of the volume 24 and having one end positioned at least partially within some of the holes 15 for the secondary air passage. This arrangement therefore allows an advantageous cooling of the lances 12 by means of the air flow outside them.

In FIG. 4 the central hole 16 has a diameter suitable only for housing one end of the gas lance 10 without allowing the passage of air from the volume 24 to the chamber of the furnace. Alternatively, the section of the hole 16 may define an inlet section of a communication conduit between the volume 24 and the cavity or area 26, obtained in the diffuser 3, in which the holes 14 for the passage of the primary air are also opened.

The diagrammatic cross section of FIG. 4 is obtained along a plane different from the section plane of FIG. 2. Therefore, in FIG. 4 there are visible only the outlet sections of the holes 14 for the passage of the first portion of comburent air.

With both the embodiments of the burner, object of the present invention, the operation by dual stage combustion, advantageously used until the fuel gas autoignition temperature is reached, is performed by simultaneously feeding the burner 1 with the gas passing through the gas lance 10, with the primary air passing through the holes 14, with the secondary air passing through the holes 15 and with the possible air passing through the conduit 13, also defined as air crown.

The air flow rate passing through the conduit 13 serves to allow an easier ignition of the burner. In case the burner is not used for the cold ignition, the hole 16 may be closed so as to avoid the passage of said air.

The gas is mixed with the primary air in the first mixing or combustion area 26 creating an understoichiometric combustion and a flame front which is fixed to the passage section between the areas 26 and 27. The excess gas and the products in this first combustion, or primary combustion, shift from area 27 towards area 28 completely mixing with the secondary air injected through the holes 15. The area 27 and the area 28 thus define a second combustion area.

The secondary air jets also serve to draw the combustion products already present in the chamber of the furnace and mix them with the comburent air and the excess gas of the primary combustion so as to reduce the percentage of $O_2$ in the volume in which the combustion occurs. Therefore, a primary combustion with a low $O_2$ concentration and a secondary combustion with a percentage of $O_2$ such as to complete the combustion are obtained. The result is a very low $NO_x$ value and a considerable mixing and dilution of the reagents of the secondary combustion both with the products of the primary combustion and with the exhaust gases already present in the chamber of the furnace. Advantageously, the burner 1 only has an inlet conduit 8 for the comburent air as the distribution of the air flow rates is adjusted by the appropriate sizes of the sections of the holes 14, 15 and 16.

Advantageously, the operation with a flameless combustion, used preferably though not necessarily once the autoignition temperature of the fuel gas has been reached, is made by simultaneously feeding the burner with the fuel gas passing through the lances 12, with the primary air passing through the holes 14, with the secondary air passing through the holes 15 and with the possible air passing through the air crown or conduit 13. The high rates of the gas exiting the lances 12 and of the secondary air exiting the holes 15 allow a recirculation of the combustion products already present in the chamber of the furnace thus lowering the percentage of $O_2$ in the combustion volume. The gas exiting from the one or more lances 12 is mixed with the possible air passing through the conduit 13, with the primary air, with the secondary air and with the combustion products in a very large volume of the furnace chamber. In virtue of the diluted mixing, the result obtained is a volume combustion in which the flame front is no longer visible and that is characterized by a higher temperature uniformity in the whole chamber of the furnace, by a thermal flow uniformity and by less polluting emissions.

As already described, the gas lances 12 are placed at least partially within at least some holes 15 for the passage of the secondary air and advantageously have a section such as to allow a minimum passage of air through the holes 15 in such a manner that the comburent air passing through the longitudinal holes 15, in which a side lance 12 is housed, has an oxygen content in a percentage in the range between 12 and 18%.

With the burner according to the present invention, in any operation, thermal power and furnace temperature range of the burner, the polluting emissions are maintained at very low levels independently of the combustion mode, if in dual-stage flame mode at any temperature or if in flameless mode at temperatures higher than the autoignition temperature. Optionally said burner is also provided with the flame detection device 21 with a UV cell which has the purpose of detecting the flame when the combustion is of the dual-stage type. When the flameless mode operation is used, the UV cell may not be used because there is no defined flame front.

The transition from an operating mode to the other one is performed by switching means including, for instance, automatic valves exchanging the gas inlet from a conduit to another one, i.e. from the flange 6 to the flange 5 or vice versa.

Some parameters of the combustion process, which ensure an effective combustion, and some design data for the burner according to the present invention are shown hereinafter:

the average injection rate of the comburent air may vary between 20÷170 m/s with pre-heated air at 200÷550° C.; the optimal rates are preferably in the range between 90 and 130 m/s;

the distribution of the air in the different stages of the combustion is: 0÷40% for the pre-mixture air exiting the conduit or crown 13, 5÷60% for the primary air, 5÷75% for the secondary air; the optimal distribution is preferably 0÷20% for the pre-mixture air, 25÷50% for the primary air, 35÷75% for the secondary air;

the percentage of oxygen in the air passing around the portions of gas lances 12, housed inside said holes 15, is a function of the distribution of the flow rate between primary air and secondary air, said percentage being advantageously in the range between 12 and 18%;

the pressure of the comburent air entering the conduit 8 may vary between 30÷55 mbar;

the pressure of the fuel gas entering the burner, upstream of the forking of the two feeding pipes connected to the flanges 5 and 6, may vary between 50÷400 mbars, preferably between 150÷250 mbars;

the axial length of the cylindrical segment 17 may vary between 5÷150 mm, preferably between 40÷90 mm; the extensive length of the cylindrical segment 17 promotes the stability of the flame and reduces the polluting emissions at the same time;

the angle of the divergent segment 18 downstream of the cylindrical segment 17 may vary between 10÷65° with respect to the axis X, preferably between 20÷45°;

the number of holes 14 for the primary air may vary between 2÷6;

the number of holes 15 for the secondary air may vary between 2÷6;

the number of gas lances 12 may vary between 1÷4;

the ratio between the diameter of the lances 12 and that of the holes 15 may be in the range between 0.1 and 1, preferably between 0.5 and 1;

the ratio between the section of the central hole 16 for the passage of the pre-mixture air and the sum of the sections of all the holes 14, 15 and 16 for the passage of air may vary between 0÷0.2;

the ratio between the sum of the sections of the holes 14 for the primary air and the sum of the sections of all the holes 14, 15 and 16 for the passage of the air may vary between 0.25÷0.5;

the ratio between the sum of the sections of the holes 15 for the secondary air and the sum of the sections of all the holes 14, 15 and 16 for the passage of the air may vary between 0.35÷0.75;

the ratio between the section of the gas lances 12 and the central gas lance 10 may vary between 0.25÷0.5;

a ratio x, defined as equivalent to the distance between the axis of the central gas lance 10 and the axis of one of the holes 15 for the secondary air divided by the distance between the same axis of the central lance 10 and the axis of one of the holes 14 for the primary air, may vary between 1.2÷3.5, preferably between 2÷3.2;

the distance of the axis of one of the two lances 12 from the axis of the central gas lance 10 depends on the distance between the holes 15 for the secondary air from the axis of the central gas lance 10.

Specifically, the number, size and arrangement of the holes 14, 15 in the refractory diffuser 3 allows to efficiently perform the dual-stage combustion and the entire combustion process according to the invention.

Advantageously, in case of dual-stage operating mode, the mean rate of the fuel gas exiting the central lance 10 may vary between 5÷70 m/s, preferably between 15÷30 m/s in the case of natural gas or between 25÷70 m/s in the case of poor gases, whereas, in the case of a flameless operating mode, the fuel gas rate exiting the side lances 12 may vary between 30÷360 m/s, preferably between 150÷250 m/s.

The combustion process displaying very low $NO_x$ emissions even at low temperatures, which is the object of the present invention and may be performed by the above disclosed burner, includes the following steps:

a) heating the combustion chamber of a furnace, with which said burner cooperatively operates, until the autoignition temperature of an used fuel gas is reached, said heating being performed by means of the operations of injecting the fuel gas through a first lance 10, centrally arranged within the burner, in a first mixing area 26 of the combustion chamber;

possibly injecting the pre-mixture air up to 40% of the total air, only in the case in which the burner is ignited when cold;

injecting a first portion of comburent air, designated primary air, in a percentage between 5 and 60% of the total air, into said first mixing area 26 through first longitudinal holes 14 of the refractory diffuser 3 arranged along a first cylindrical surface so that a primary combustion occurs with a gas excess;

injecting a second portion of comburent air, designated secondary air, in a percentage in the range between 5 and 75% of the total air, into a second mixing area 27 of the combustion chamber, arranged downstream of the first mixing area 26, through second longitudinal holes 15 of the refractory diffuser 3 arranged along a second cylindrical surface which is coaxial and external with respect to the first surface, so that a secondary combustion occurs with an air excess which completes the combustion of said first portion of fuel gas;

b) when the temperature of the combustion chamber is higher than the autoignition temperature of the fuel gas, the combustion process continues including the following operations:

injecting fuel gas into the second mixing area 27, 28 through at least one second lance 12, laterally arranged within the burner and at least partially housed within a second respective hole 15;

injecting said first portion of comburent air, in a percentage in the range between 5 and 60% of the total air, into said first mixing area 26 through the first longitudinal holes 14, and injecting of said second portion of comburent air, in a percentage in the range between 5 and 75% of the total air, into the second mixing area 27, 28 through the second longitudinal holes 15, so that a flameless combustion occurs because of a dilution of fuel gas and comburent air due to the combustion products present in the combustion chamber;

wherein the variation of the injection of the fuel gas during the transition from step a) to step b) occurs by means of appropriate switching means, for instance by means of one or more valves.

When the temperature of the combustion chamber is higher than that of autoignition of the fuel gas, the combustion process may also continue by the mode of the same stage a), i.e. with a dual-stage flame combustion mode, thus always ensuring low $NO_x$ emissions. As an alternative, a transition to stage b) may advantageously be achieved by varying the feeding of the fuel gas, from the central lance to the one or more side lances or nozzles, and by leaving the introduction of comburent air required in stage a) unaltered, so as to obtain a flameless combustion because of the significant dilution of the reagents (air and gas) due to the exhaust gases.

By using a dual-stage combustion, the first mixing area 26 represents a reducing area of the combustion chamber (gas excess reaction), whereas the second mixing or combustion area, including areas 27 and 28, represents an oxidizing area (air excess reaction). In this second area the remaining part of fuel gas, the secondary comburent air and the products of the primary combustion are burnt thus obtaining a secondary combustion with air excess which completes the combustion of step a).

The process according to the invention allows to minimize the polluting emissions in any operation range, in terms of capacity of the burner, of operating temperature of the furnace, of comburent air temperature and of oxygen excess in the chamber, etc.

Processing and process controlling means, integrated with the above disclosed burner, may be provided to perform the above said process according to the invention. Said burner displaying great flexibility in any use condition advantageously features low implementation costs, it is characterized by particularly low emission levels right from the first instant of its operation thus providing particularly interesting industrial results in all operation ranges of a typical heating furnace. Specifically, in virtue of the ease in switching the flame conditions, the burner displays a wide range of "chamber temperatures", at which temperatures its operation features a substantial flame stability. The burner of the invention therefore ensures low emissions even when in the furnace the operating temperatures fluctuate for a certain period near the autoignition temperature of the fuel gas.

Further advantages of the burner are:
the installation ease on typical combustion systems;
and the single inlet provided for the comburent air.

The specific modes to embody the invention described here do not limit the content of this application, which includes all the variants of the invention according to the claims.

The invention claimed is:

1. A low $NO_x$ emission industrial burner including:
   a hollow metal body defining a longitudinal axis,
   a refractory diffuser, arranged at an open end of the hollow body so as to define a volume within said body, the refractory diffuser having a cavity defining a first combustion area,
   a second combustion area downstream of the first combustion area and in communication therewith,
   a first injection lance for injection of a fuel gas, centrally arranged within said hollow body, in communication at one end with said first combustion area,
   at least one second injection lance for injection of the fuel gas, laterally arranged within said hollow body, directly in communication at one end with said second combustion area,
   switching means adapted to switch the injection of the fuel gas from the first injection lance to said at least one second injection lance or vice versa,
   a conduit for feeding comburent air into said volume,
   first longitudinal holes for the injection of a first portion of the comburent air, provided in the refractory diffuser and arranged along a first cylindrical side surface, each first longitudinal hole having an outlet section directly in communication with the first combustion area,
   second longitudinal holes for the injection of a second portion of the comburent air, provided in the refractory diffuser and arranged along a second cylindrical side surface, which is coaxial and external to the first cylindrical side surface, each second longitudinal hole having an outlet section directly in communication with the second combustion area,
   wherein said at least one second injection lance for the injection of the fuel gas is at least partially housed within a respective second longitudinal hole for the injection of a second portion of the comburent air,
   said burner being adapted to perform a multistage flame combustion during heating of a combustion chamber until an autoignition temperature of the fuel gas is reached and, indifferently, a multistage flame combustion or a flameless combustion at temperatures higher than said autoignition temperature, thus ensuring low $NO_x$ emissions at any operating conditions.

2. A burner according to claim 1, wherein there is provided a further injection lance for the fuel gas, said further lance being coaxial and external to the first injection lance, which is subdivided at a first end into at least two of said second injection lances, whereas at a second end it is adapted to be in communication with a pipe of a fuel gas feeding system through a first flange.

3. A burner according to claim 1, wherein both the number of the first longitudinal holes and the number of the second longitudinal holes is between 2 and 6.

4. A burner according to claim 3, wherein there are provided second injection lances in a number comprised from 1 to 4.

5. A burner according to claim 4, wherein there are provided two second injection lances partially positioned coaxially within two of four second longitudinal holes.

6. A burner according to claim 5, wherein the first injection lance has a first end inserted in a central hole, provided in the diffuser and connecting the volume with the first combustion area, and a second end adapted to be in communication with a pipe of a feeding system of the fuel gas through an axial flange.

7. A burner according to claim 6, wherein the second combustion area includes at least a first cylindrical segment, having a longitudinal extension in the range between 5 and 150 mm, and a second segment having an inner divergent profile with a 10 and 65° angle with respect to the axis.

8. A burner according to claim 4, wherein the second injection lances and the second longitudinal holes define respective diameters, the ratio between the diameter of the second injection lances and the diameter of the second longitudinal holes is in the range between 0.1 and 1.

9. A burner according to claim 8, wherein there are provided two second injection lances partially positioned coaxially within two of the four second longitudinal holes.

10. A burner according to claim 9, wherein the first injection lance has a first end inserted in a central hole, provided in the diffuser and connecting the volume with the first combustion area, and a second end adapted to in communication with the pipe of a feeding system of the fuel gas through an axial flange.

11. A burner according to claim 10, wherein the second combustion area includes at least a first cylindrical segment, having a longitudinal extension in the range between 5 and 150 mm, and a second segment having an inner divergent profile with a 10 and 65° angle with respect to the axis.

12. A very low $NO_x$ emission combustion process, performed by means of a burner and a furnace with which said burner cooperatively operates, including the following steps:
   a) heating a combustion chamber of the furnace until the autoignition temperature of a used fuel gas is achieved, said heating being performed by means of the simultaneous operations of
      injecting the fuel gas through the first injection lance, centrally arranged within the burner, in the first combustion area of the combustion chamber;
      injecting the first portion of the comburent air into said first combustion area through the first longitudinal holes of the refractory diffuser arranged along the first cylindrical side surface so that a primary combustion occurs with a gas excess; and
      injecting the second portion of the comburent air into the second combustion area, arranged downstream of the first combustion area, through second longitudinal holes of the refractory diffuser arranged along the second cylindrical side surface which is coaxial and external with respect to the first cylindrical side surface, so that a secondary combustion occurs with an air excess which completes the combustion of the fuel gas injected; and
   b) when the temperature of the combustion chamber is higher than the autoignition temperature of the fuel gas, the combustion process continues including the following simultaneous operations of:
      injecting fuel gas into the second combustion area through at least one second injection lance, laterally arranged within the burner and at least partially housed within a respective second longitudinal hole; and
      injecting said first portion of comburent air into said first combustion area through the first longitudinal holes and injecting said second portion of comburent air into the second combustion area through the second longitudinal holes, so that a flameless combustion occurs because of a dilution of fuel gas and comburent air by the combustion products present in the combustion chamber;
      wherein the variation of the injection of the fuel gas during the transition from step a) to step b) occurs by means of appropriate switching means.

13. A process according to claim 12, wherein the injection of the first and second portions of comburent air is obtained by feeding comburent air by means of a conduit into the volume of the burner, defined by the diffuser, at a predetermined pressure variable in the range 30 and 55 mbars.

14. A process according to claim 12, wherein a pre-mixture air injection, is provided through a central hole, provided in the diffuser and connecting the volume with the first combustion area, in the case in which a cold ignition of the burner is required; and wherein said pre-mixture air is in a percentage up to 40% of the total comburent air, preferably up to 20%.

15. A process according to claim 12, wherein the feeding pressure of the fuel gas entering the burner is between 50 and 400 mbars; and wherein during step a) the mean rate of the fuel gas exiting the first injection lance is in the range between 5 and 70 m/s, whereas during step b) in which a flameless combustion occurs, the rate of the fuel gas exiting the at least one second injection lances is in the range between 30 and 360 m/s.

16. A process according to claim 12, wherein the comburent air passing through the second longitudinal holes, in which the at least one second injection lance is housed, has an oxygen content in a percentage in the range between 12 and 18%.

17. A process according to claim 16, wherein the average rate of injection of the comburent air is between 20 and 170 m/s with air pre-heated at a temperature of 200 and 550° C.

18. A process according to claim 17, wherein the first portion of comburent air is in a percentage in the range between 5 and 60% of the total air, preferably between 25 and 50%, and wherein the second portion of the comburent air is in a percentage in the range between 5 and 75% of the total air, preferably between 35 and 75%.

* * * * *